United States Patent
Garcia Martin et al.

(10) Patent No.: US 10,386,123 B2
(45) Date of Patent: Aug. 20, 2019

(54) HEAT EXCHANGER UNIT AND METHOD FOR MANUFACTURING A HEAT EXCHANGER UNIT

(71) Applicant: FAGOR ARRASATE S. COOP., Arrasate (ES)

(72) Inventors: Mikel Garcia Martin, Arrasate-Mondragon (ES); Alain Armendariz Huici, Aretxabaleta (ES); Julen Garitano Alustiza, Bergara (ES)

(73) Assignee: FAGOR ARRASATE S. COOP., Arrasate (ES)

( * ) Notice: Subject to any disclaimer, the term of this patent is extended or adjusted under 35 U.S.C. 154(b) by 378 days.

(21) Appl. No.: 14/959,086

(22) Filed: Dec. 4, 2015

(65) Prior Publication Data
US 2016/0084588 A1 Mar. 24, 2016

Related U.S. Application Data

(63) Continuation of application No. PCT/EP2014/061067, filed on May 28, 2014.

(30) Foreign Application Priority Data

Jun. 10, 2013 (EP) .................................... 13382221

(51) Int. Cl.
*F28F 1/22* (2006.01)
*F28D 1/047* (2006.01)
(Continued)

(52) U.S. Cl.
CPC ................ *F28F 1/00* (2013.01); *B23P 15/26* (2013.01); *F25D 23/061* (2013.01);
(Continued)

(58) Field of Classification Search
CPC .. F28F 1/00; F28F 1/22; F28F 2265/26; F28F 2275/02; B23P 15/26; F28D 1/0477;
(Continued)

(56) References Cited

U.S. PATENT DOCUMENTS 1,987,422 A * 1/1935 Steenstrup ............ F25D 23/006
  165/135
2,386,889 A  8/1940 Furry
(Continued)

FOREIGN PATENT DOCUMENTS

GB  438267  11/1935

OTHER PUBLICATIONS

European Search Report EP13382221, dated Nov. 12, 2013, 8 pages.
The International Search Report and the Written Opinion, PCT/EP2014/061067, dated Jul. 14, 2014, 9 pages.

*Primary Examiner* — Jacob J Cigna
*Assistant Examiner* — Lee A Holly
(74) *Attorney, Agent, or Firm* — Edell, Shapiro & Finnan, LLC

(57) ABSTRACT

A heat exchange unit that may be used in a cooling apparatus. According to one implementation the heat exchanger unit comprises a metal sheet, at least one metal exchange tube supported on said sheet, and fastening means for fastening the tube to the sheet, said unit being bent with respect to at least one bend line. The fastening means comprises a cover covering the entire or almost the entire length of the tube and the cover is fixed to the sheet by means of adhesive. The surface of the cover in contact with the tube has no adhesive, said surface having a coefficient of friction that allows sliding said tube under said cover when bending the unit with respect to said at least one bend line.

6 Claims, 3 Drawing Sheets

(51) Int. Cl.
  *B23P 15/26*    (2006.01)
  *F28F 1/00*     (2006.01)
  *F25D 23/06*    (2006.01)

(52) U.S. Cl.
  CPC ............. *F28D 1/0477* (2013.01); *F28F 1/22* (2013.01); *F25B 2339/023* (2013.01); *F28F 2265/26* (2013.01); *F28F 2275/02* (2013.01)

(58) Field of Classification Search
  CPC .. F25D 23/061; F25B 2339/023; F25B 39/04; F25B 39/02
  See application file for complete search history.

(56) References Cited

U.S. PATENT DOCUMENTS

| | | | |
|---|---|---|---|
| 2,612,351 A | | 9/1952 | Janos |
| 2,625,378 A | * | 1/1953 | Nason .................. F25D 23/061 165/136 |
| 6,536,227 B1 | * | 3/2003 | Lee ........................ F25B 39/02 165/171 |
| 2011/0162641 A1 | * | 7/2011 | Bitter .................... B21D 53/08 126/661 |
| 2014/0138072 A1 | * | 5/2014 | Luketic .................. F25B 39/02 165/170 |

* cited by examiner

HEAT EXCHANGER UNIT AND METHOD FOR MANUFACTURING A HEAT EXCHANGER UNIT

CROSS-REFERENCE TO RELATED APPLICATIONS

This application relates to and claims the benefit and priority to International Application No. PCT/EP2014/061067, filed May 28, 2014, which claims the benefit and priority to European Application No. 13382221, filed Jun. 10, 2013.

TECHNICAL FIELD

The present invention is related to a heat exchange unit, in particular for cooling appliances, and to a method for manufacturing a heat exchange unit.

BACKGROUND

Convection heat exchangers in which a fluid circulates around a solid, for example inside a tube, and in which, given the existence of a temperature difference between both, a heat exchange takes place, are known.

In particular heat exchangers in which a tube through which a cooling liquid circulates is arranged on a metal sheet are known. Such exchangers are used, for example, in cooling appliances, freezers, boilers, etc. The tube is generally arranged on the largest possible surface of the metal sheet to improve the heat exchange, so it is usually necessary to bend the tube so that it has the same shape as the sheet on which it is going to be fixed, as shown for example in U.S. Pat. No. 2,386,889A. To that end, the tube can be bent on one side and the sheet on the other, and the tube can be fixed to the sheet after bending. Another option is to fix the tube to the sheet and bend them together. It is known that bending the tube and the sheet together can cause the crushing of the tube, which is not convenient because it would limit circulation of the cooling liquid. Bending the tube and the sheet together is also known to cause marks on the sheet, damaging it.

Documents U.S. Pat. No. 1,987,422A and GB438267A describe a method for making heat exchangers. Said method comprises the following steps: a step in which a conduit is placed on a metal sheet, a step in which said conduit is fixed to the sheet through cleats, said cleats allowing the conduit to slide under the same, and a step in which the unit formed by the sheet and the conduit is bent, sliding the conduit with respect to the sheet such that the radius of curvature of the conduit is substantially greater than that of the sheet.

Document U.S. Pat. No. 2,625,378A discloses a heat exchange comprising a metal sheet, a metal exchange tube supported on said sheet, and fastening means for fastening the tube to the sheet, said heat exchange being bent with respect to at least one bend line and the fastening means comprising a cover covering almost the entire length of the tube, said cover being fixed to the sheet by means of adhesive.

SUMMARY OF THE DISCLOSURE

A first aspect is related to a heat exchange unit, in particular for a cooling appliance, comprising a metal sheet, at least one metal exchange tube supported on said sheet, and fastening means for fastening the tube to the sheet, said unit being bent with respect to at least one bend line. The fastening means comprise a cover covering the entire or almost the entire length of the tube, said cover being fixed to the sheet by means of adhesive. The surface of the cover in contact with the tube has no adhesive, therefore said surface having a coefficient of friction that allows sliding said tube under said cover when bending the unit with respect to said at least one bend line.

A second aspect of the invention is related to a method for manufacturing a heat exchange unit comprising a metal sheet and at least one metal exchange tube. The method comprises the following steps:

a step in which the tube is arranged on the sheet,
a step in which the entire or almost the entire length of the tube is covered with a cover, the surface of the cover in contact with the tube having a coefficient of friction that allows sliding said tube under said cover,
a step in which the cover is fixed to the sheet and
a step in which the sheet is bent, the tube being slid under the cover.

The sliding the tube under the cover enables being able to bend the sheet and the tube at the same time, making up for the developmental difference between the sheet and the tube due to the different radii of curvature.

The unit has the additional advantage that by covering the entire or almost the entire length of the tube with the cover, contact between the tube and the sheet is assured and it allows insulating the contact surface of the tube with the sheet from external elements such as insulators (for example polyurethane foam in the case of units for cooling appliances), allowing the contact surface to be maximum and thereby improving thermal efficiency of the heat exchanger.

These and other advantages and features will become evident in view of the drawings and the detailed description.

DETAILED DESCRIPTION

FIGS. 1 to 5 show a first embodiment of a heat exchange unit, in particular for a cooling appliance. The heat exchange unit 1 comprises a metal sheet 2, a metal exchange tube 3 supported on said sheet 2, and fastening means for fastening the tube 3 to the sheet 2. In this first embodiment, the metal sheet 2 is rectangular, being able to have different shapes in other embodiments. The section of the tube 3 is substantially circular. In other embodiments, the part of the tube 3 that is supported on the sheet 2 can be substantially planar. The contact surface between the sheet 2 and the tube 3 would thereby be increased, thus improving thermal efficiency of the unit 1.

Figure 4:
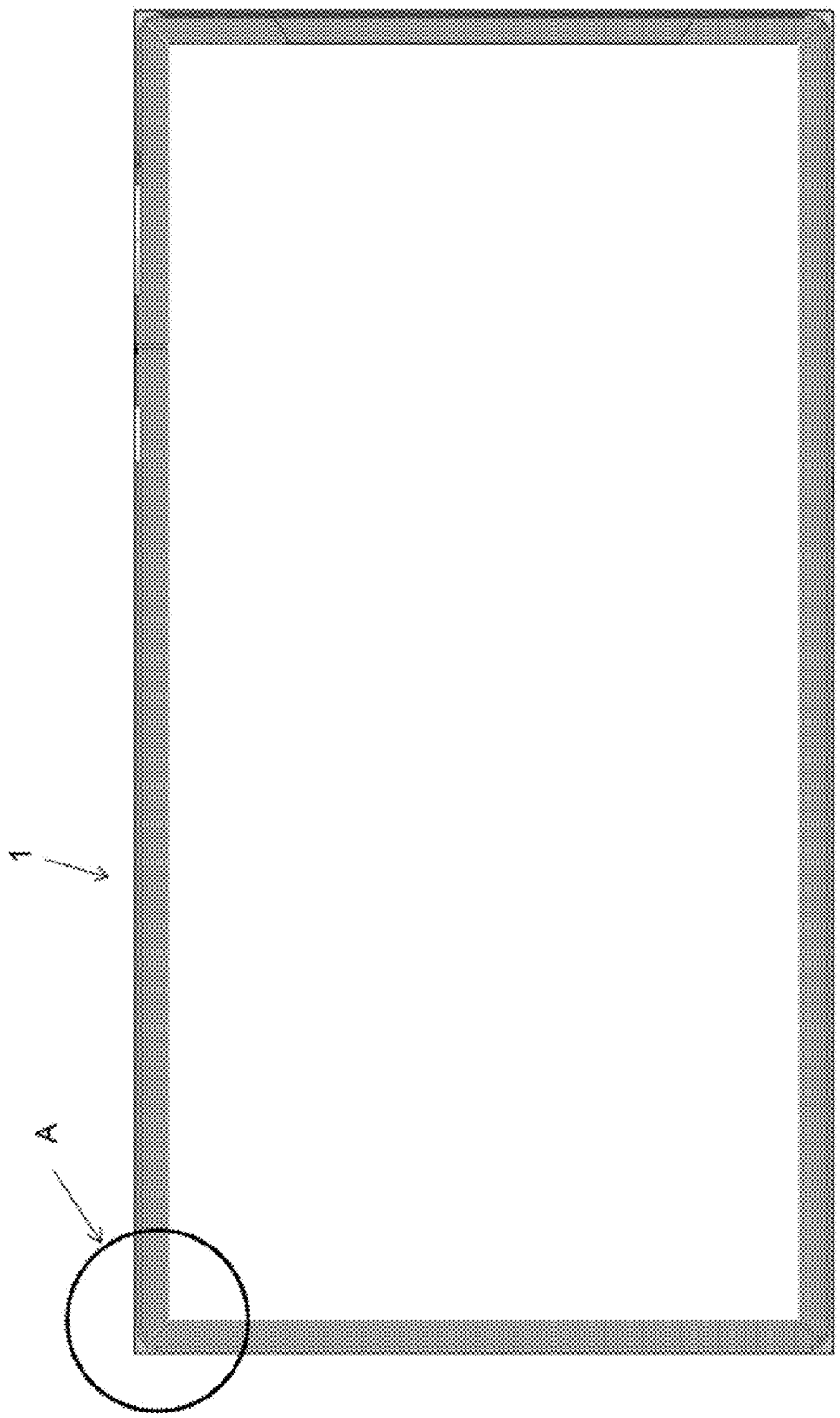
FIG. 4 is a plan view of the heat exchange unit shown in FIG. 1 after the unit is bent.

The heat exchange unit 1 is bent with respect to the bend line 7*a*, 7*b*, 7*c*, 7*d*, as can be seen in FIG. 4. Therefore in this embodiment, the unit 1 is bent forming a closed enclosure with a rectangular base. In other embodiments, the heat exchange unit 1 can be bent configuring different shapes.

Heat exchange units 1 which are bent into a U shape, L shape, C shape, etc., are common.

Figure 1:
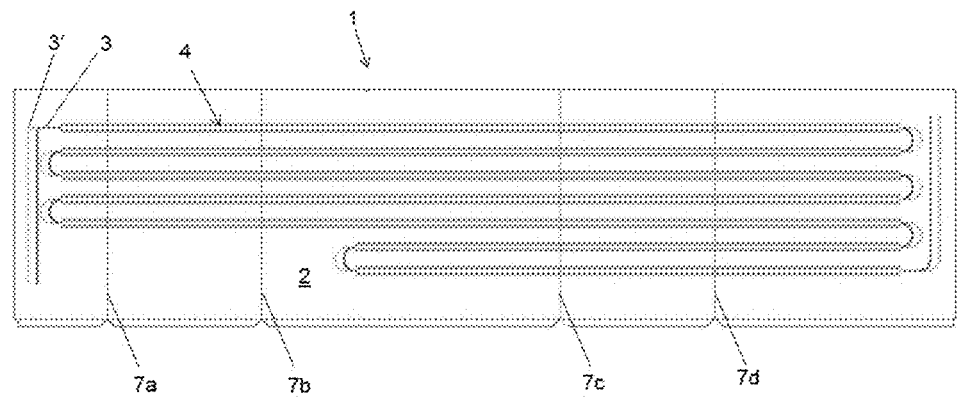
FIG. 1 shows a view of a first embodiment of the heat exchange unit before the unit is bent.
Figure 2:
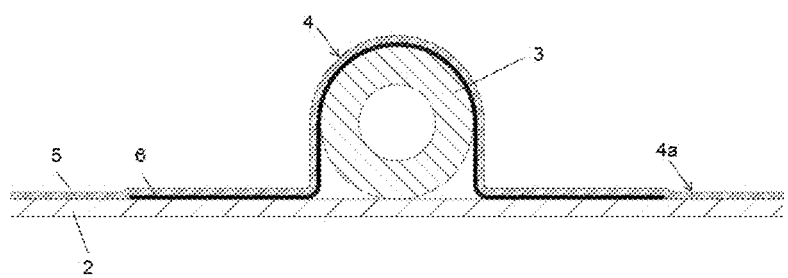
FIG. 2 is a partial cross-section view of the heat exchange unit shown in FIG. 1.
Figure 3:
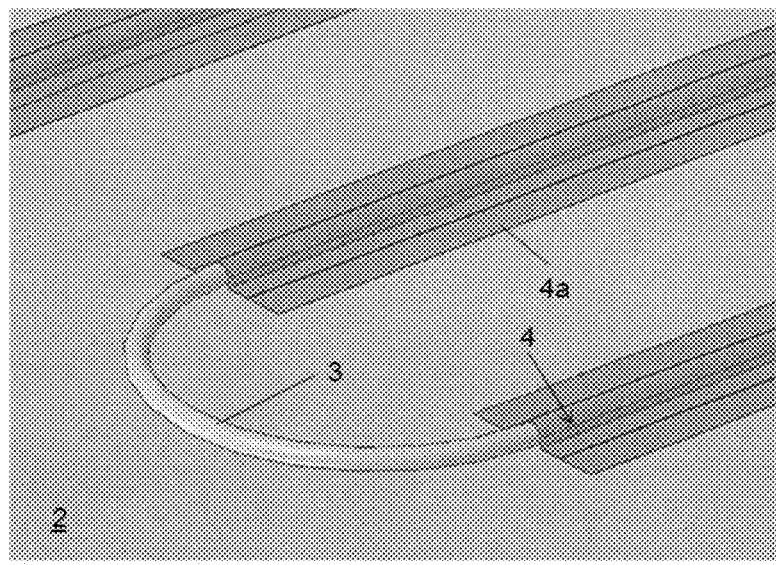
FIG. 3 is a partial perspective view of the heat exchange unit shown in FIG. 1.

In this first embodiment, the fastening means comprises a cover 4 covering almost the entire length of the tube 3, as shown in FIG. 1. Since the cover 4 covers almost the entire length of the tube 3, contact between the tube 3 and the sheet 2 is assured and it allows insulating the contact surface of the tube 3 with the sheet 2 from external elements such as insulators (for example polyurethane foam in the case of units for cooling appliances), allowing the contact surface to be maximum and thereby improving thermal efficiency of the heat exchanger 1.

Figure 5:
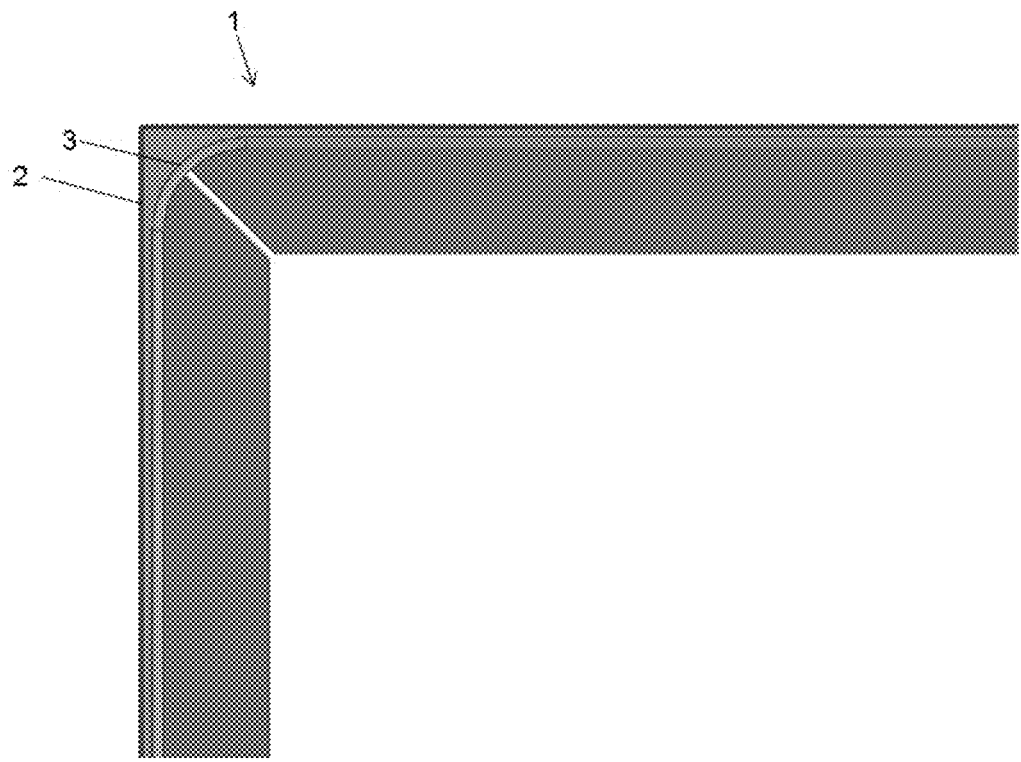
FIG. 5 is detail A of FIG. 4.

Furthermore, the surface of the cover 4 in contact with the tube 3 has a coefficient of friction that allows sliding said tube 3 under said cover 4 when bending the unit 1 with respect to the bend lines 7a, 7b, 7c, 7d. Sliding said tube 3 under said cover 4 enables bending the sheet 2 and the tube 3 at the same time, said sliding of the tube 3 allowing compensating the difference in the radii of curvatures of the sheet 2 and the tube 3, as can be seen in FIG. 5. FIG. 1 shows the arrangement of the tube 3 with respect to the sheet 2 before bending the unit. It also shows with discontinuous lines the disposition the tube 3' will have with respect to the sheet 2 once the unit 1 is bent.

In this first embodiment, the cover 4 comprises an aluminum tape 5. In other embodiments, the tape 5 can be made of any other material with thermal conduction properties, such as copper or any other known material complying with said features. Said tape 5 has adhesive on the side facing the sheet 2 whereby it fixes the cover 4 to the metal sheet 2.

In other possible embodiments in which the tape 5 does not have adhesive, the fastening means can comprise an adhesive tape for fastening the cover 4 to the sheet 2.

On the other hand, in this embodiment the cover 4 comprises a plastic strip 6 fixed to said tape 5, the surface of the plastic strip 6 corresponding with the surface of the cover 4 in contact with the tube 3. The plastic strip 6 must be wide enough for the tube 3 to be able to slide under the cover 4.

In other possible embodiments, the strip can be made of any other material provided that it meets the condition that the coefficient of friction of said strip allows sliding the tube 3 under the cover 4. On the other hand, in other embodiments, the strip can be eliminated if the condition that the contact surface of the tape 5 with the tube 3 allows sliding the latter is met. To that end, at least the part of the tape 5 in contact with the tube 3 should not have elements that prevent sliding the tube 3 in the tape 5, such as adhesives for example.

Figure 6:
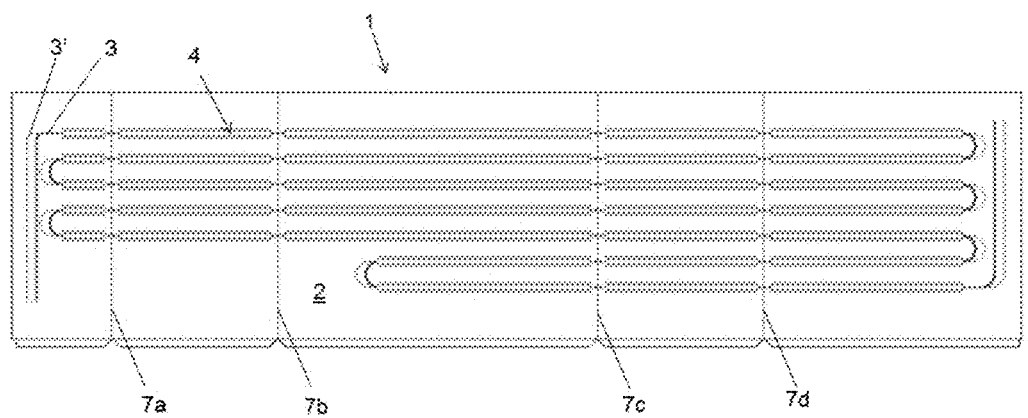
FIG. 6 shows a second embodiment of the heat exchange unit before the unit is bent.

FIG. 6 shows a second embodiment of the heat exchange unit 1 This second embodiment differs from the first embodiment in that the cover 4 does not cover the surfaces of the tube 3 close to the bend lines 7a, 7b, 7c, 7d. When bending the heat exchange unit 1, the cover 4 often becomes detached or it can even partially break in these areas close to said bend lines 7a, 7b, 7c, 7d. The remaining features are similar to those of the first embodiment, so it is not necessary to describe them again.

A method for manufacturing a heat exchange unit 1 according to one embodiment may comprise the following steps:

first the tube 3 is arranged on the sheet 2, then the entire or almost the entire length of the tube 3 is covered with a cover 4, for example as shown in FIG. 1 or FIG. 6. The surface of the cover 4 in contact with the tube 3 has to have a coefficient of friction that allows sliding said tube 3 under said cover 4, next the cover 4 is fixed to the sheet 2 and finally the sheet 2 is bent, the tube 3 being slid under the cover 4. As previously explained, the unit can be bent under different shapes, being able to be bent forming a closed enclosure as shown in FIG. 4 for example.

The invention claimed is:

1. A method of making a heat exchanger unit, the method comprising:

placing a first surface of a metal exchange tube in contact with a second surface of a metal sheet, covering at least a portion of the metal exchange tube with one or more plastic strips, each of the one or more plastic strips having a bottom surface facing the metal exchange tube and a top surface opposite the bottom surface, covering the at least a portion of the metal exchange tube with a one or more covers, the one or more covers being respectively arranged on the top surface of the one or more plastic strips, the one or more covers and the one or more plastic strips being held stationary on the metal sheet, the bottom surface of the one or more plastic strips having a coefficient of friction that allows a sliding of the metal exchange tube within the one or more covers, the one or more covers and one or more plastic strips being arranged on the metal exchange tube in a manner to insulate the first and second surfaces from external elements to prevent an introduction of such external elements between the first and second surfaces, simultaneously bending the metal exchange tube and metal sheet along one or more bend lines with the metal exchange tube being slid under the one or more plastic strips and one or more covers.

2. The method according to claim 1, wherein the one or more covers comprise a tape having one or more adhesive regions that fix the tape, and consequently the one or more plastic strips, to the metal sheet.

3. The method according to claim 2, wherein the tape is thermally conductive.

4. The method according to claim 3, wherein the thermally conductive tape comprises an adhesive that fixes the cover to the metal sheet.

5. The method according to claim 1, wherein upon the completion of the covering of the metal exchange tube the one or more covers do not cover the metal exchange tube at the one or more bend lines.

6. The method according to claim 1, wherein the metal exchange tube comprises a serpentine shape having straight sections that are joined by curved sections, upon the completion of the covering of the metal exchange tube, one or more of the curved sections are not covered by the one or more covers.

* * * * *